Nov. 27, 1923.                                                                1,475,391
G. JAQUETTE
MEAT SLICING MACHINE
Filed Nov. 18, 1921

Grantham Jaquette   INVENTOR.

Patented Nov. 27, 1923.

1,475,391

UNITED STATES PATENT OFFICE.

GRANTHAM JAQUETTE, OF PHILADELPHIA, PENNSYLVANIA.

MEAT-SLICING MACHINE.

Application filed November 18, 1921. Serial No. 516,142.

*To all whom it may concern:*

Be it known that I, GRANTHAM JAQUETTE, a citizen of the United States, residing at Philadelphia, State of Pennsylvania, have invented certain new and useful Improvements in Meat-Slicing Machines, of which the following is a specification, reference being had to the accompanying drawing, forming a part of this specification.

Figure 1:
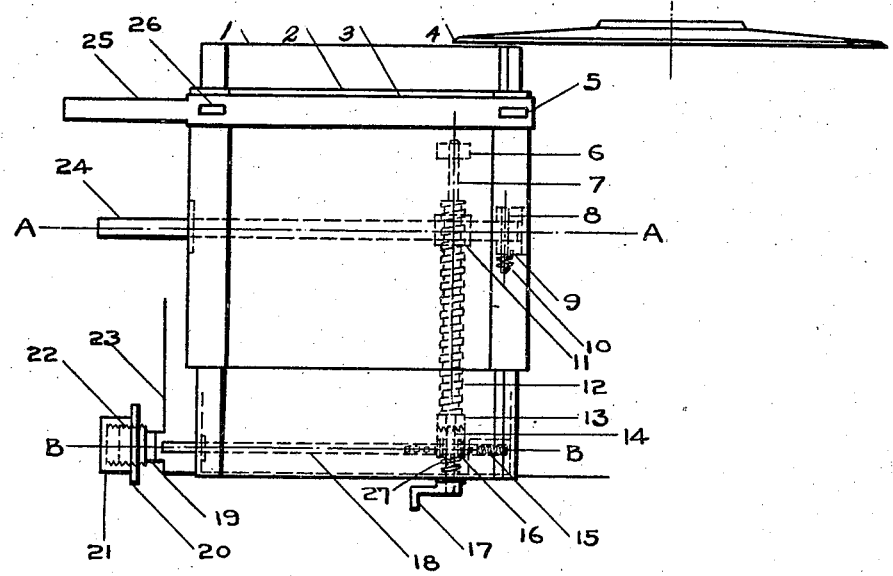
Figure 2:
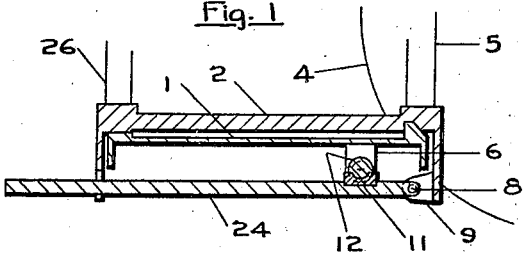
Figure 3:
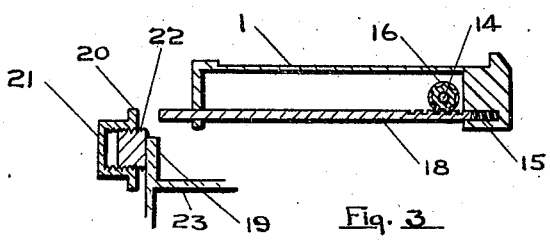

Referring to the drawing, Fig. 1 represents a plan view showing the parts of a meat slicing machine which are related to my invention. Fig. 2 shows a sectional view through line A—A and Fig. 3 shows a sectional view through line B—B, Fig. 1. My invention relates to meat slicing machines having a reciprocating carriage and a meat table, to which the meat is attached for the slicing operation. These parts are represented by numbers 1 and 2 respectively, while the knife is shown by 4 and the base of the slicing machine is shown by 23, in fragment. Posts 26 and 5 hold meat clamp 25.

My invention covers an improved construction of the mechanism whereby meat table 2 is made to have an intermittent forward motion toward knife 4 for each successive slice, and has for its object to provide a simple, sanitary, and efficient construction.

Regulating knob 21, fitted with flange 20, and threaded upon stud 22, may be screwed backward or forward upon said stud, which is rigidly attached to machine base 23, by means of boss 19. Graduations are marked around flange 20 to indicate thickness of slice for various positions of knob 21, the operation of which is as follows:—

Slidable rack 18, carried by reciprocating carriage 1, collides with flange 20 at the extreme leftward position of said carriage, and, being slidable, rack 18 does slide, being thrust to the right against recoil spring 15, which subsequently pushes rack 18 back to its original position, when said rack is free and clear of flange 20. Rack 18 being engaged with rotatable pinion 16, which rotates upon shaft 14 and carries with it ratchet 13, imparts to the said pinion and ratchet an intermittent forward and back rotating motion, which is greater when flange 20 is farther forward on stud 22 toward carriage 1. Ratchet 16 is in mesh with ratchet 13 and as the teeth on said ratchets are designed with teeth having inclined angles on one side and vertical angles on the other, they grip on the forward thrust but skip on the reverse thrust, being held lightly together by spring 27. Thus ratchet 13 receives from ratchet 16 only an intermittent motion in one direction, namely, anti-clockwise. As ratchet 13 is integral with feed worm 12, the feed worm also has the intermittent motion of ratchet 13. As feed nut 11 is engaged with worm 12, it will have an intermittent forward motion toward knife 4, which motion occurs when carriage 1 is in its extreme leftward position, and rack 18 collides with flange 20. This motion is utilized to feed the meat toward knife 4 for each slice, as feed nut 11 is attached to lever 24, which is attached to arm 9, which is in turn attached to meat table 2, to which the meat is attached.

Having described the operation of my invention, I claim the following construction of this device:—

1. In a meat slicing machine, a reciprocating carriage, a meat table, a feed mechanism comprising a feed worm mounted beneath the reciprocating carriage, a feed nut bearing thereon, a lever attached to said feed nut, an arm supporting said lever and extending around the side of the reciprocating carriage and attached to the meat table.

2. In a meat slicing machine a meat table, a reciprocating carriage, a feed worm having an extending shaft, a ratchet device secured thereon, a second ratchet device rotatable thereon and meshing with and rotating the first ratchet device, a pinion attached to the second ratchet device, a slidable rack meshing with said pinion, an adjustable stop abutted by slidable rack, a recoil spring for the purpose of returning slidable rack to its original position.

In testimony whereof I hereunto affix my signature.

GRANTHAM JAQUETTE.

Witnesses:
MERVIN H. KOHLER,
HOWARD J. BLUMRICK.